(12) United States Patent
Phuyal et al.

(10) Patent No.: US 9,622,284 B2
(45) Date of Patent: Apr. 11, 2017

(54) USER EQUIPMENT AND METHOD FOR RADIO ACCESS NETWORK ASSISTED WLAN INTERWORKING

(71) Applicant: Intel IP Corporation, Santa Clara, CA (US)

(72) Inventors: Umesh Phuyal, Hillsboro, OR (US); Mo-Han Fong, Sunnyvale, CA (US); Sasha Sirotkin, Petach Tikva (IL); Nageen Himayat, Fremont, CA (US); Shu-Ping Yeh, Campbell, CA (US)

(73) Assignee: Intel IP Corporation, Santa Clara, CA (US)

( * ) Notice: Subject to any disclaimer, the term of this patent is extended or adjusted under 35 U.S.C. 154(b) by 253 days.

(21) Appl. No.: 14/572,641

(22) Filed: Dec. 16, 2014

(65) Prior Publication Data

US 2016/0043937 A1    Feb. 11, 2016

Related U.S. Application Data

(60) Provisional application No. 62/035,176, filed on Aug. 8, 2014.

(51) Int. Cl.
*H04J 3/00* (2006.01)
*H04W 76/02* (2009.01)
*H04W 48/18* (2009.01)
*H04W 84/12* (2009.01)
*H04W 88/06* (2009.01)

(52) U.S. Cl.
CPC ......... *H04W 76/026* (2013.01); *H04W 48/18* (2013.01); *H04W 84/12* (2013.01); *H04W 88/06* (2013.01)

(58) Field of Classification Search
CPC .................................................. H04W 76/026
USPC .......................................... 370/339
See application file for complete search history.

(56) References Cited

U.S. PATENT DOCUMENTS

| 8,848,640 B2* | 9/2014 | Reznik | H04W 36/026 370/329 |
| 2016/0127945 A1* | 5/2016 | Cui | H04W 28/0247 370/329 |

* cited by examiner

*Primary Examiner* — Dang Ton
(74) *Attorney, Agent, or Firm* — Schwegman Lundberg & Woessner, P.A.

(57) ABSTRACT

A User Equipment is disclosed that is configured to perform traffic steering from a RAN (e.g., 3GPP system) to a WLAN, or vice versa, based on one or more rules. In an embodiment, the UE performs the traffic steering to the WLAN based on whether data is to be transmitted from or received by the UE. In another embodiment, the UE performs the traffic steering based on receipt of RAN assistance parameters without checking the status of the UE upload buffers or the eNB/AP download buffers. In yet another embodiment, the UE performs the traffic steering based on the latest RAN assistance information and a time elapsed since the last transmission or receipt of data.

23 Claims, 8 Drawing Sheets

USER EQUIPMENT AND METHOD FOR RADIO ACCESS NETWORK ASSISTED WLAN INTERWORKING

This application claims the benefit of priority under 35 U.S.C. 119(e) to U.S. Provisional Patent Application Ser. No. 62/035,176, filed Aug. 8, 2014, which is incorporated herein by reference in its entirety.

TECHNICAL FIELD

Embodiments described herein generally relate to radio access networks (RAN). Some embodiments relate generally to user equipment (UE) traffic steering between cellular network(s) and WLAN. Some embodiments relate to 3GPP LTE, IEEE 802.11, WCDMA, and E-UTRAN networks.

BACKGROUND

For mobile voice and data communication purposes, user equipment (UE) (e.g., cellular telephones) may communicate with base stations (e.g., evolved node B (eNodeB, eNB)) that are part of Evolved Universal Mobile Communication System (UMTS) Terrestrial Radio Access Networks (E-UTRAN). UEs may also communicate with IEEE 802.11 based systems (e.g., WLAN, WiFi) for voice and data communications over a more limited range. If a UE is communicating over one of the E-UTRAN system or the IEEE 802.11 system that is experiencing a high traffic load, it may be beneficial to partially or fully move the traffic for that UE to the other system in order to improve communication performance There are general needs for steering a UE between a radio access network (RAN) and WLAN.

DETAILED DESCRIPTION

Mobile communication, both voice and data, has experienced increasing growth since its inception. Initially, UE were used in cellular networks (E-UTRAN) for voice communications over a relatively large range. Cellular data communication (e.g., GPRS, EDGE, Third generation partnership project (3GPP) LTE) was later added for data communication. Wireless Local Area Networks (WLAN), as defined by IEEE 802.11 standards, were initially used for wireless data communication but eventually added voice communication as well. Access Points (APs) for the WLAN have relatively recently become ubiquitous. Most consumer businesses now provide APs to enable their customers to connect with the Internet with their wireless UE over a more limited range than cellular. Due to the rapid growth of wireless data and voice communications, both RANs may be overloaded by the traffic volume.

Most modern UEs may now include multiple radio access technologies (RATs). Thus, the UE may be able to communicate over both RAN as well as WLAN. In the subsequently described embodiments, traffic may be steered or offloaded from one system to another on a workload basis. Thus, if the 3GPP is overloaded and a nearby AP for WLAN has capacity, the UE's traffic may be seamlessly switched to the WLAN system, fully or partially. The reverse steering from the WLAN system to the 3GPP system may also be accomplished under the same embodiments.

This traffic steering (i.e., offloading) from one network to another may be accomplished by the 3GPP network nodes (e.g., eNB) broadcasting RAN assistance information to help the UE make traffic steering decisions using a system information block (SIB) or a dedicated signal transmitted to the UE such as, for example, the Radio Resource Control (RRC) Connection Reconfiguration message.

The decision to steer the UE traffic may be made in multiple ways using multiple criteria. For example, in an embodiment, the traffic steering decision procedure is only performed when there is data to be transmitted from or to the UE. In other words, an upload buffer at UE or a download buffer at the eNB or AP is non-empty, as indicated by a time elapsed since a last packet was sent or received. For traffic steering decisions, the UE may: a) utilize the stored SIB information if available and valid or b) wait until updated RAN assistance information may be broadcast or dedicatedly signaled and received by the UE.

In another embodiment, an up-to-date decision for steering traffic may be made regardless of any buffer status. For example, the steering may be performed when RAN assistance information changes so that the UE or the network is ready whenever needed.

In yet another embodiment, the UE retains the most up-to-date RAN assistance information and decides to steer traffic to or from the WLAN based on the RAN assistance information and time elapsed since the last sent or received data packet. In other words, the steering is performed based on traffic characteristics. These various embodiments are subsequently described in greater detail with reference to FIGS. 2-7.

Subsequently described embodiments may use any RAN. Reference to steering between 3GPP and WLAN is for purposes of illustration only as the present embodiments may perform traffic steering between any RAN and WLAN.

Figure 1:
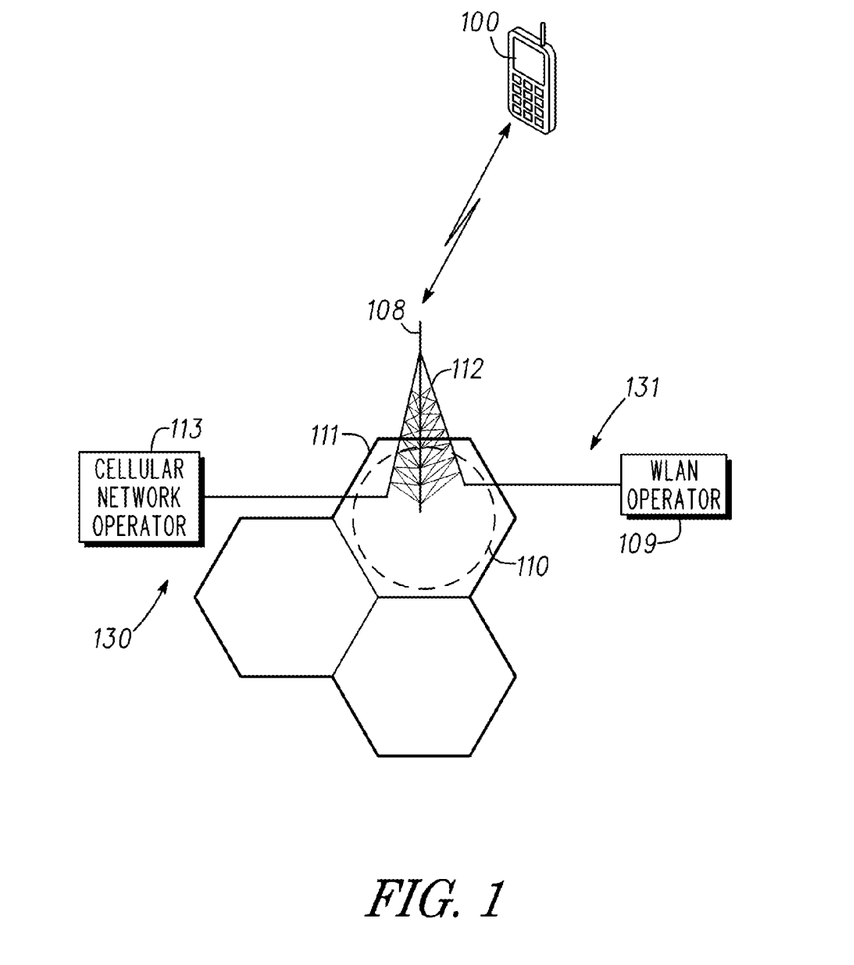
FIG. 1 illustrates an embodiment of a UE migrating between two radio access networks in accordance with some embodiments.
Figure 8:
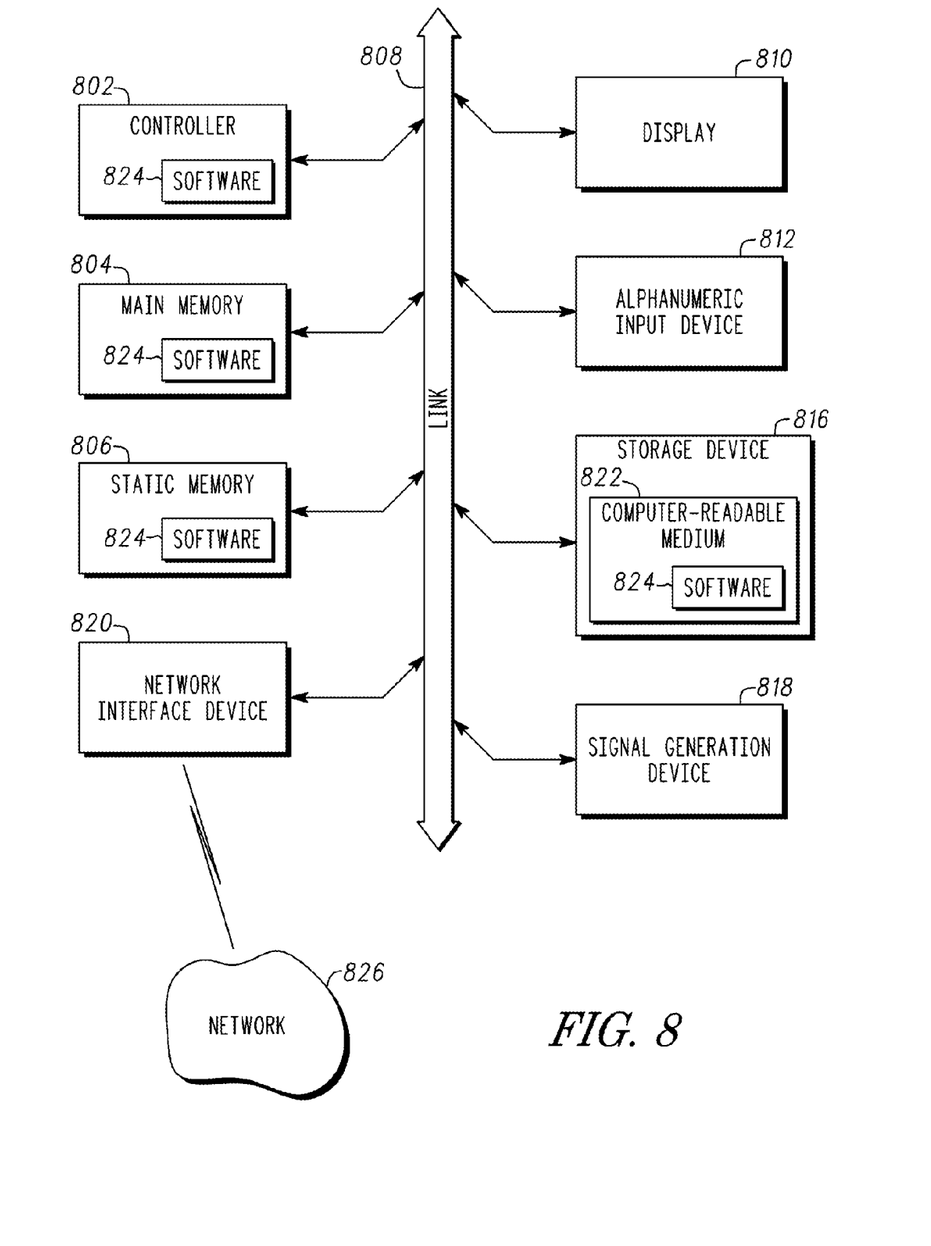
FIG. 8 illustrates a block diagram of an embodiment of a device in accordance with some embodiments in accordance with some embodiments.

FIG. 1 illustrates an embodiment of a system including a UE 100 migrating between two RANs 130, 131 in accordance with some embodiments. The UE 100 may be a cellular telephone or some other mobile communications device, as illustrated in FIG. 8 and discussed subsequently.

The system may further include a cellular network 130 (E-UTRAN, RAN) having a plurality of cells 111. Each cell 111 may have a base station (e.g., eNB) 112 for communication within that particular cell 111. A cellular network operator 113, comprising switches, controllers, and servers, may be coupled between landline communication lines (e.g., Internet, telephone lines) and the eNBs of the network 130. This provides the UE 100 with wireless access to the landline communications. The cellular network 130 may communicate with the UE 100 over 3GPP.

A WLAN 131 of the system may include an AP 108 that provides an area of coverage 110 for the WLAN 131. When the UE 100 is within the area of coverage, it may access the landline communication lines (e.g., Internet, telephone lines) through the WLAN operator 109. The WLAN operator 109 may also include servers, controllers, and switches.

The WLAN 131 may be deployed by the same cellular network operator or a different operator. The WLAN AP 108 is shown collocated with E-UTRAN eNB 112, logically or physically. However, other embodiments may have separate antennas and only substantially overlapping cells 111 and coverage areas 110.

The UE 100 may be moving through an area served by both the WLAN 131 and the cellular network 130. For example, if the UE 100 is communicating with the eNB 112 and that network 130 is overloaded with traffic, the UE may be offloaded to the WLAN 131 so that it communicates with the AP 108. Embodiments for performing this traffic steering are discussed subsequently.

Subsequent embodiments may use system information block (SIB) information and RAN assistance information. The SIB information may be defined as data that is transmitted from E-UTRAN to the UE that the UE needs to read and decode. The SIB information may be transmitted over the broadcast control channel (BCCH).

The RAN assistance information may be defined as data that are broadcast by the E-UTRAN that the UE may use to configure its network settings to enable the UE to communicate with the network and/or make traffic steering decision. For example, the information may include UTRAN signal strength thresholds as well as other data.

Figure 2:
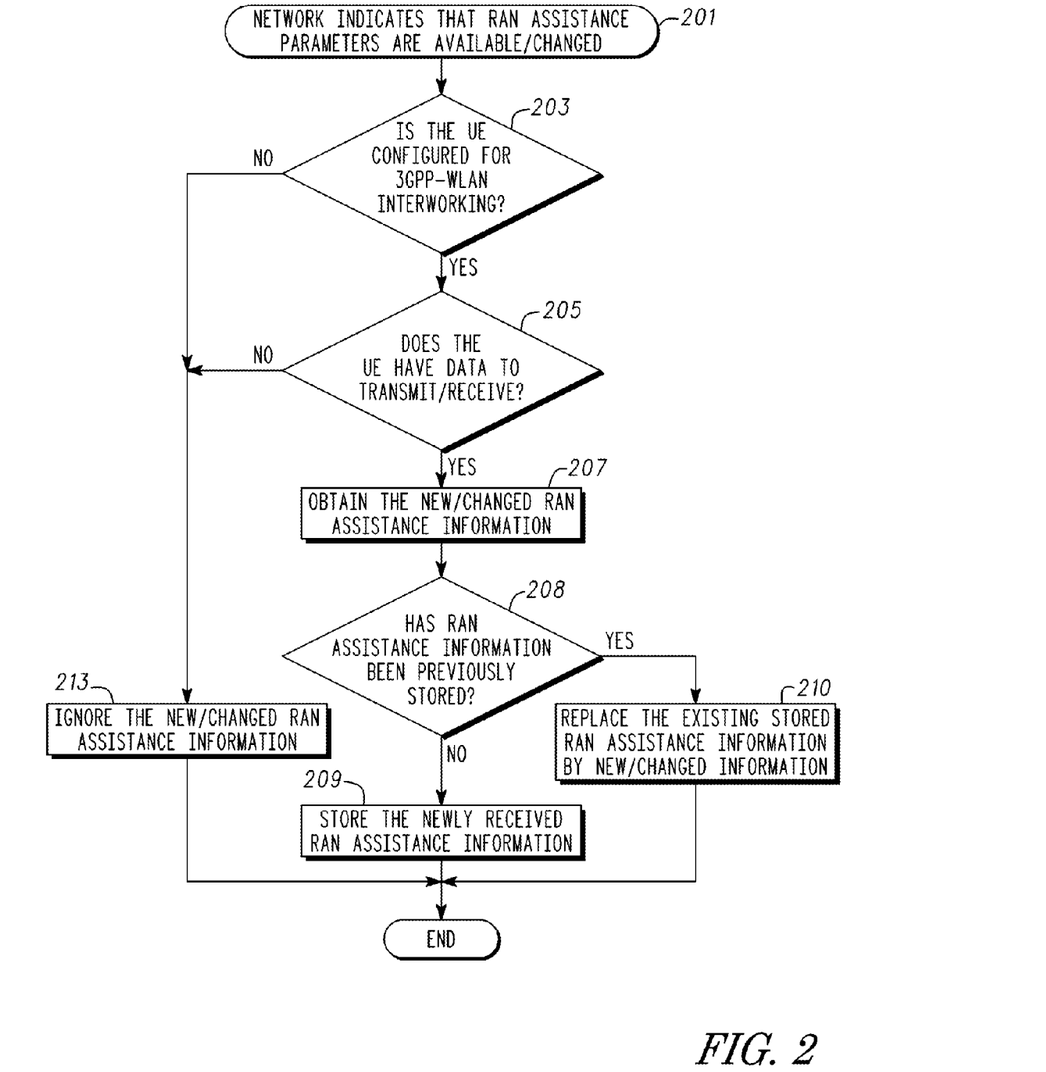
FIG. 2 illustrates a flowchart of an embodiment of a method for storing up-to-date RAN assistance information for traffic steering when data is to be transmitted from or to the UE in accordance with some embodiments.

FIG. 2 illustrates a flowchart of an embodiment of a method for storing up-to-date RAN assistance information for traffic steering when data is to be transmitted from or to the UE in accordance with some embodiments. This embodiment may be useful for traffic steering to save battery power by minimizing the number of SIB or dedicated RAN assistance parameter acquisition and/or offloading decisions where each UE's traffic is intermittent (i.e., follows a bursty traffic pattern).

In this embodiment, the UE reads, decodes, and uses updated RAN assistance information only if there is an expectation of data to be transmitted or received (e.g., data in the transmission buffer of the UE, data in the download buffer of the AP or eNB, or insufficient time has elapsed since last reception of data). Thus, a UE that does not have data to be communicated can be energy efficient since it does not need to receive and take action on the SIB broadcast periodically. For example, UEs in an idle mode or UEs that are in discontinuous reception (DRX) or WLAN sleep states do not need to take any action until the UE can determine that there is an expectation of data to be transmitted or received.

The UE can determine the requirement of data transmission or reception in multiple ways. For example, an indication from the upper layer of a UE that its transmission buffer is non-empty and data transmission is necessary, the UE is not in dormant (DRX or Sleep) state on the LTE or the WLAN link(s), or monitoring the time elapsed since last transmission and reception of data to check whether it exceeds a given threshold. Note that such thresholds may be set based on knowledge of traffic class/type/characteristics and the expected data rates and inter-arrival statistics for this traffic class or type. In general, traffic predication algorithms used for entering or leaving DRX modes may be used. More generally, such thresholds may be set adaptively such as the threshold is scaled up or down based on packet arrivals or departures.

When the UE determines that it has data to be transmitted or received, the UE can use the previously stored RAN assistance information to make a traffic steering decision. Alternatively, the UE can wait until the next SIB broadcast or dedicated signaling instance to read the up-to-date information and apply the updated information.

Referring to FIG. 2, in block 201, the UE initiates the method when a network broadcast (e.g., systemInfoValueTag in SystemInformationBlockType1) or a dedicated signaling received by the UE indicates that RAN assistance information are changed and/or available (e.g., in SIB17 or dedicated RAN assistance information message). In an embodiment, this may be when a change notification is received by the UE.

In block 203, the UE checks whether the UE is configured for 3GPP-WLAN interworking. If the UE is configured for 3GPP-WLAN interworking, the UE checks and determines whether it has any data to be transmitted or received, in block 205. This may be accomplished as described previously.

If the UE is not configured for 3GPP-WLAN interworking or does not have data to be transmitted or received, the UE ignores the updated RAN assistance information (e.g., SIB17) or dedicated RAN assistance information message, in block 213.

If the UE is configured for 3GPP-WLAN interworking and the download buffer and/or the upload buffer are non-empty, in block 207, the UE receives and decodes the updated SIB information (e.g., SIB17) or the dedicated RAN assistance information message.

At block 208, it is determined if RAN assistance information has been previously stored in the UE. If the RAN assistance information has not previously been stored, the UE stores the received RAN assistance information at block 209.

If previously received RAN assistance information have been stored in the UE, at block 210 the UE replaces the existing stored RAN assistance information with the updated information that were received. A traffic steering decision may then be made based on the results of one of the embodiments of FIGS. 3-5.

Figure 3:
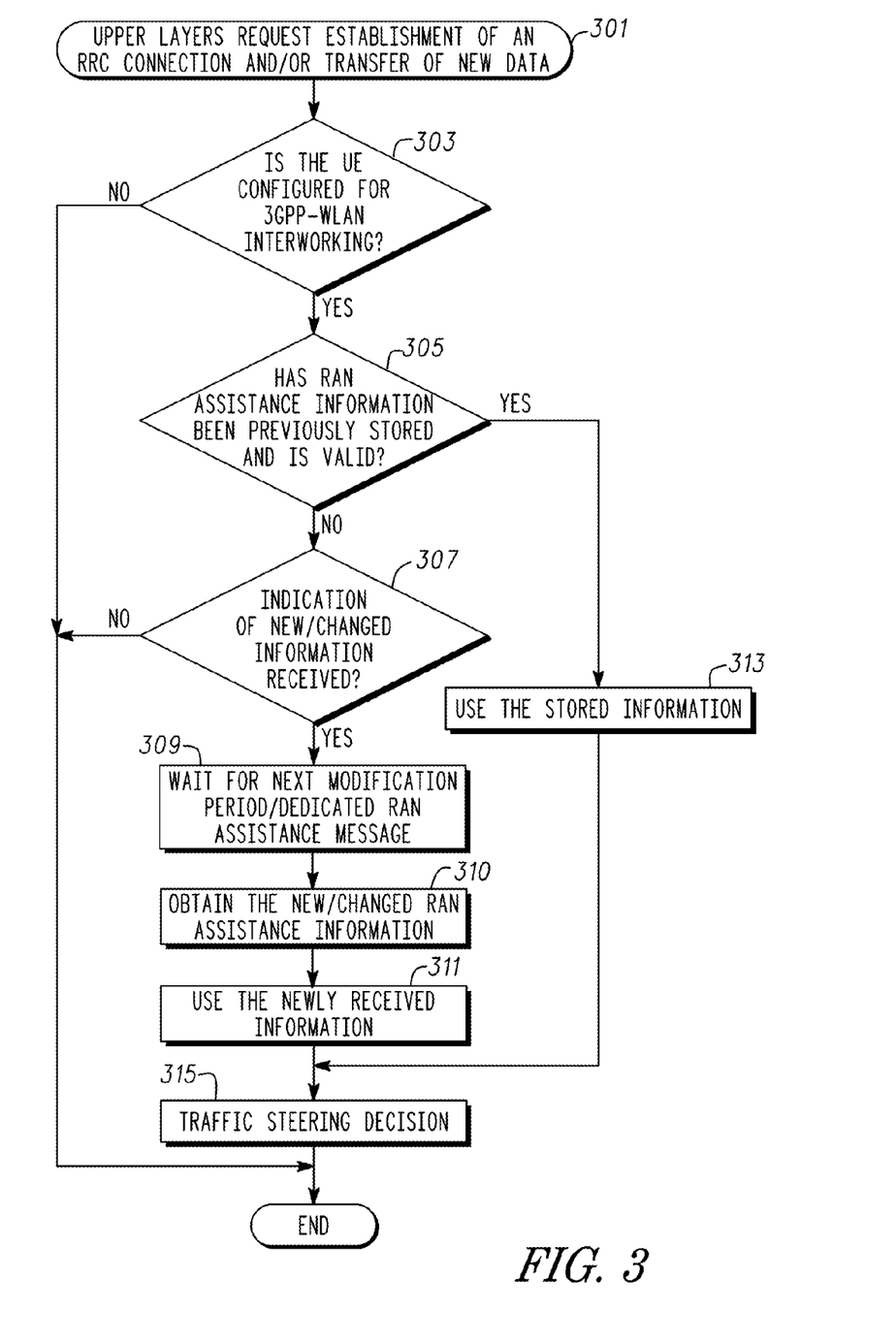
FIG. 3 illustrates a flowchart of an embodiment of a method for traffic steering when data is to be transmitted from or to the UE utilizing stored and valid RAN assistance information or new RAN assistance information obtained via broadcast or dedicated signaling in accordance with some embodiments.

FIG. 3 illustrates a flowchart of an embodiment of a method for traffic steering when data is to be transmitted from or to the UE utilizing stored and valid RAN assistance information or new RAN assistance information obtained via broadcast or dedicated signaling in accordance with some embodiments. The UE initiates this method, at block

301, when upper layers of the network or UE request establishment of an RRC connection and/or transfer of new data while the UE is in RRC_IDLE.

At block 303, the UE determines whether it is configured for 3GPP-WLAN interworking. If the UE is configured for 3GPP-WLAN interworking, at block 305 the UE determines whether RAN assistance information have been previously stored and are valid (i.e., not outdated, unexpired). If the RAN assistance information are stored and valid, at block 313 the UE immediately uses the stored RAN assistance information.

If the RAN assistance information are absent or invalid (i.e., outdated or expired) and, at block 307, the network has already indicated that the RAN assistance information are available or changed (e.g., using systemInfoValueTag in SystemInformationBlockType1 or dedicated signaling), at block 309 the UE will wait until it has obtained the updated RAN assistance information (e.g., SIB17 or dedicated RAN assistance information message) at block 310. At block 311, the UE uses the newly received RAN assistance information. A decision to perform a traffic steering decision to another network is executed at block 315.

Figure 4:
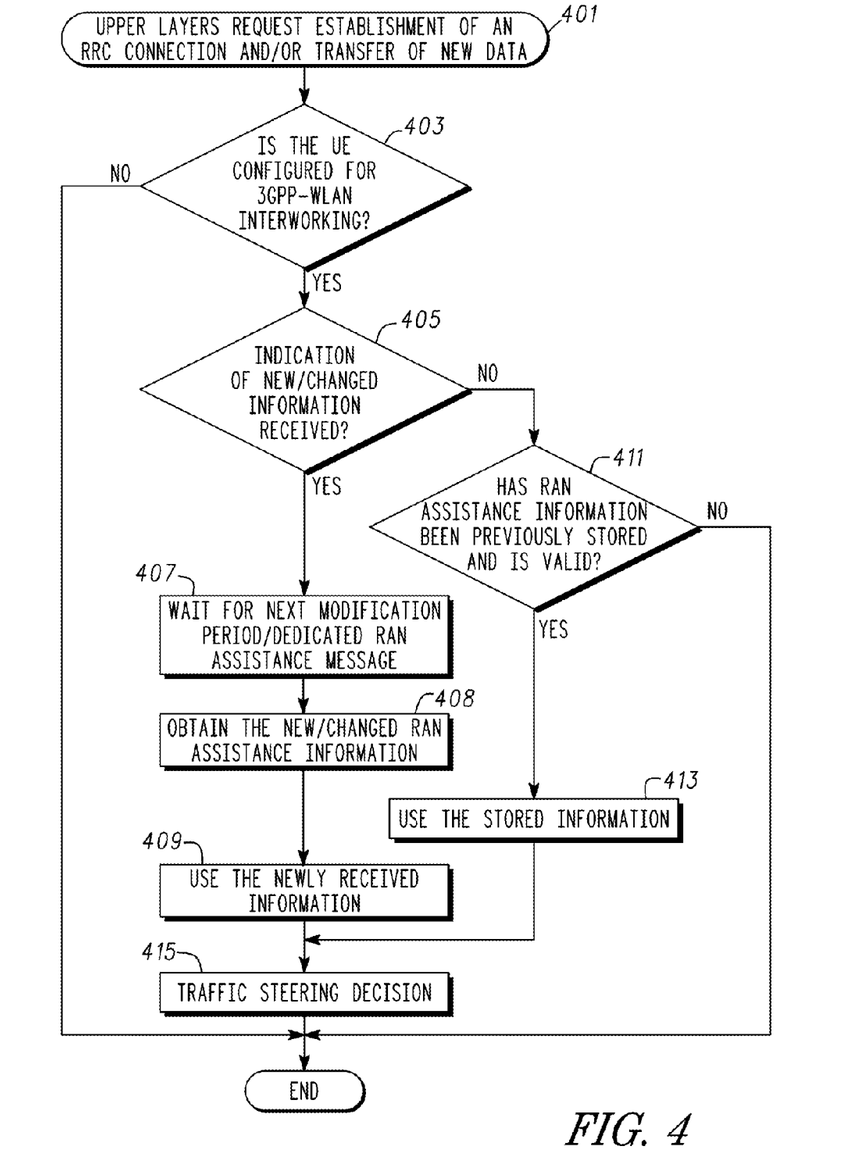
FIG. 4 illustrates a flowchart of another embodiment of a method for traffic steering when data is to be transmitted from or to the UE utilizing stored and valid RAN assistance information or new RAN assistance information obtained via broadcast or dedicated signaling in accordance with some embodiments.

FIG. 4 illustrates a flowchart of another embodiment of a method for traffic steering when data is to be transmitted from or to the UE utilizing stored and valid RAN assistance information or new RAN assistance information obtained via broadcast or dedicated signaling in accordance with some embodiments. The UE initiates this method, at block 401, when upper layers of the network or UE request establishment of an RRC connection and/or transfer of new data while the UE is in RRC_IDLE.

At block 403, the UE determines whether it is configured for 3GPP-WLAN interworking. If the UE is configured for 3GPP-WLAN interworking, at block 405, if the network has already indicated that the RAN assistance information is available or changed (e.g., using systemInfoValueTag in SystemInformationBlockType1 or dedicated signaling), the UE will wait, at block 407, until it has obtained the updated RAN assistance information (e.g., SIB17 or dedicated RAN assistance information message) at block 408. The UE will then use the newly received RAN assistance information to perform a traffic steering decision to another network at blocks 409, 415. Otherwise, at blocks 411, 413, the UE will use the previously stored information if it is available and valid.

Figure 5:
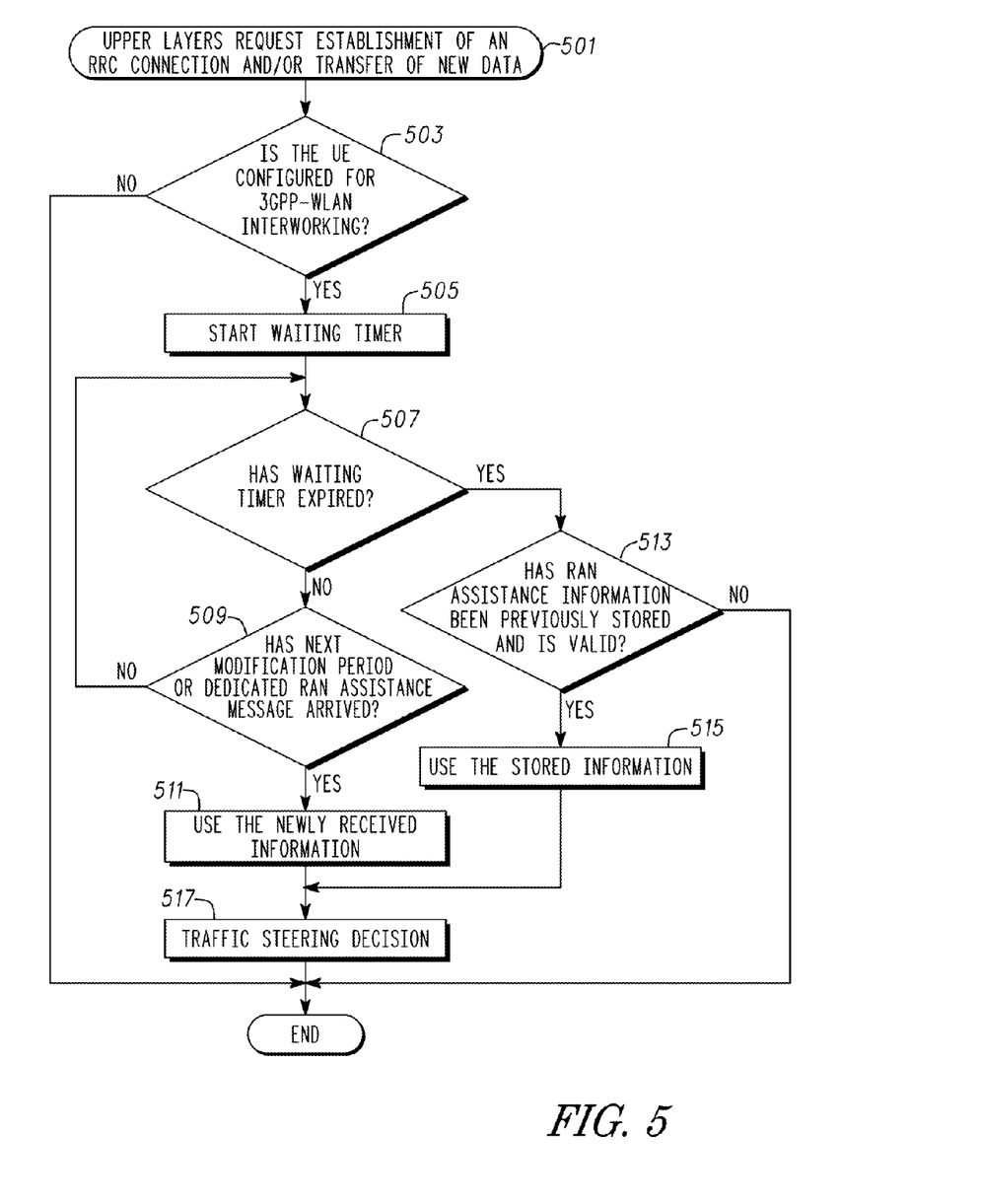
FIG. 5 illustrates a flowchart of yet another embodiment of a method for traffic steering when data is to be transmitted from or to the UE utilizing stored and valid RAN assistance information or new RAN assistance information obtained via broadcast or dedicated signaling in accordance with some embodiments.

FIG. 5 illustrates a flowchart of yet another embodiment of a method for traffic steering when data is to be transmitted from or to the UE utilizing stored and valid RAN assistance information or new RAN assistance information obtained via broadcast or dedicated signaling in accordance with some embodiments. The UE initiates this method, at block 501, when upper layers of the network or UE request establishment of an RRC connection and/or transfer of new data while the UE is in RRC_IDLE.

At block 503, the UE determines whether it is configured for 3GPP-WLAN interworking. If the UE is configured for 3GPP-WLAN interworking, at block 505, the UE starts a waiting timer and, at block 507, checks whether the waiting timer has expired. While the waiting timer has not expired, the UE keeps waiting and checking at blocks 509, 507 until the next SIB modification period or dedicated signaling instance for obtaining updated RAN assistance information has arrived.

The waiting timer determines the maximum waiting period after which, if updated RAN assistance information is still not obtained, the UE can use the stored information, at blocks 513, 515, if it is available and valid. This timer can be based on, for example, the SIB modification period or traffic characteristics. The UE may then use either the newly received RAN assistance information, at block 511, or the previously stored RAN assistance information at block 515 to perform a traffic steering decision to another network at block 517.

Figure 6:
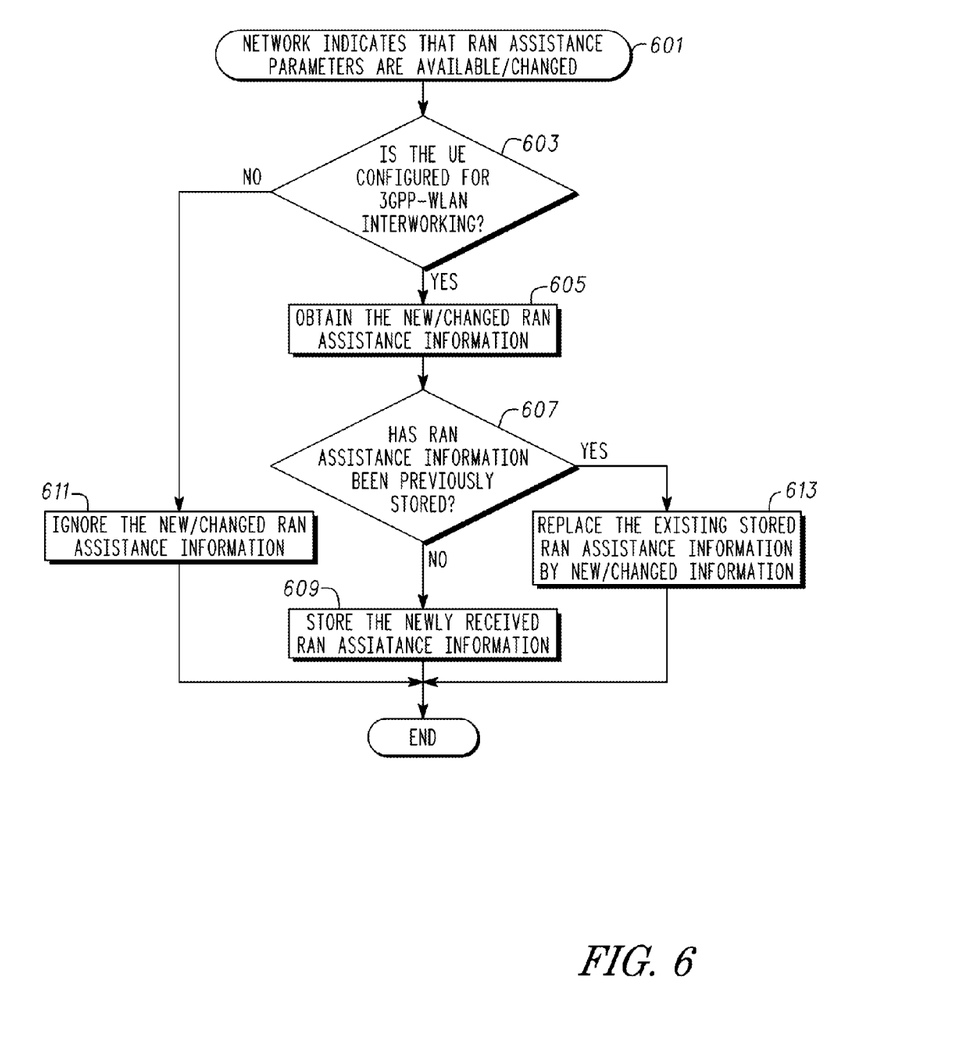
FIG. 6 illustrates a flowchart of an embodiment of a method for obtaining and storing RAN assistance information regardless of buffer status when RAN assistance information changes in accordance with some embodiments.

FIG. 6 illustrates a flowchart of an embodiment of a method for obtaining and storing RAN assistance information regardless of buffer status when RAN assistance information changes in accordance with some embodiments. In this embodiment, the UE reads, decodes and stores updated RAN assistance information as soon as it is available regardless of the transmission buffer status. The UE can use the latest broadcast or dedicated RAN assistance information that is stored by it from the previous SIB broadcast or dedicated signaling, so it does not need to wait until the next SIB update if the information is already present and is valid.

This embodiment assumes that the UE is configured for 3GPP-WLAN interworking. The UE initiates the method, at block 601, when a network broadcast (e.g., systemInfoValueTag in SystemInformationBlockType1) or dedicated signaling indicates that RAN assistance parameters are changed or available (e.g., in SIB 17 or dedicated RAN assistance information message). This may be indicated by a change notification being received by the UE.

At block 603, the UE checks whether the UE is configured for 3GPP-WLAN interworking. If the UE is configured for 3GPP-WLAN interworking, at block 605 the UE receives and decodes the updated RAN assistance information (e.g., SIB17) or the dedicated RAN assistance information message.

If RAN assistance information has not been previously stored in the UE, at block 607, the UE stores the newly received RAN assistance information at block 609.

If previously received RAN assistance information has been stored in the UE, the UE replaces the existing stored RAN assistance information with the current information received at block 613. If the UE is not configured for 3GPP-WLAN interworking, the UE ignores the changed or available RAN assistance information at block 611. The newly received RAN assistance information is then used to perform a traffic steering decision by the UE to another system (another RAT or network) as specified in the embodiment of FIG. 3.

Figure 7:
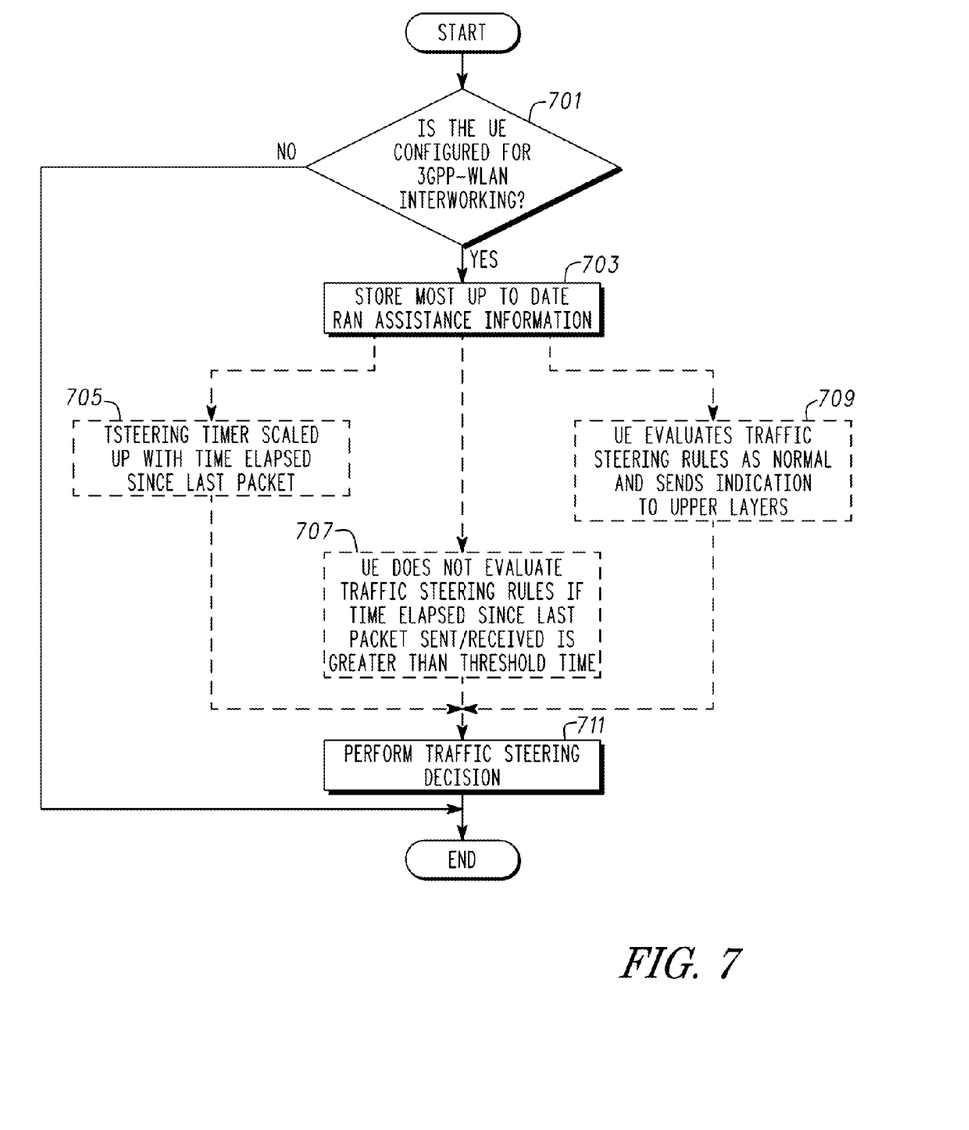
FIG. 7 illustrates a flowchart of an embodiment of a method for traffic steering based on the RAN assistance information and time elapsed since last transmission in accordance with some embodiments.

FIG. 7 illustrates a flowchart of an embodiment of a method for traffic steering based on stored RAN assistance information and the time elapsed since the last transmission in accordance with some embodiments. This embodiment uses a $T_{steeringWLAN}$ timer that specifies a time value during which the rules are fulfilled before starting the traffic steering between the 3GPP system and the WLAN, and $T_{sinceLastPacket}$ that specifies the time duration since the last packet was sent or received by the UE.

In blocks 701, 703, if the UE supports traffic steering between (E)-UTRAN or 3GPP and WLAN it keeps the most up to date RAN assistance parameters received via broadcast and/or dedicated signaling. The UE takes into account the time elapsed since the last packet was sent or received by the UE (i.e., $T_{sinceLastPacket}$). This can be implemented in multiple embodiments as indicated by blocks 705, 707, 709.

For example, in block 705, the $T_{steeringWLAN}$ timer may be scaled up (i.e. increased) according to the time elapsed since the last packet was sent or received by the UE (i.e., $T_{sinceLastPacket}$). The longer the time period since the last packet, the greater the increase of the $T_{steeringWLAN}$ timer. The scaling of the timer may be a function of a probability of packet transmission or reception and may be predicted based on traffic characteristics of each traffic session.

In block 707, the UE does not evaluate predetermined traffic steering rules (e.g., defined in Technical Specification (TS) 36.304/ TS 25.304) if the time elapsed since the last packet was transmitted or received by the UE (i.e., $T_{sinceLastPacket}$) is greater than a certain predetermined threshold time. In block 709, the UE evaluates the predetermined traffic steering rules (e.g., defined in TS 36.304/TS 25.304) as it normally would and sends the indication to the upper layers of the network. The upper layers may not react immediately upon such indication, but may take into account the time period that has elapsed since the last packet was transmitted or received by the UE (i.e., $T_{sinceLastPacket}$) in making the traffic steering decision. At block 711, a traffic steering decision may then be made based on above embodiments and the most updated RAN assistance information.

FIG. 8 is a block diagram illustrating an apparatus in the example form of a UE (single and multiple RAT), an access point (AP), and/or a cellular base station (e.g., eNodeB, eNB) in accordance with some embodiments. A set or sequence of instructions may be executed, as illustrated in FIGS. 2-7, to cause the communication apparatus to perform any one of the methodologies discussed herein, according to an example embodiment.

In some embodiments, the communication apparatus operates as a standalone device or may be connected (e.g., networked) to other communication apparatuses. The communication apparatus may be a mobile communication device (e.g., cellular telephone, UE), a computer, a personal computer (PC), a tablet PC, a hybrid tablet, a personal digital assistant (PDA), or part of any device configured to execute instructions (sequential or otherwise) that specify actions to be taken by the communication apparatus. The term "processor-based system" shall be taken to include any set of one or more communication apparatuses that are controlled by or operated by a processor (e.g., a computer) to individually or jointly execute instructions to perform any one or more of the methodologies discussed herein.

The communication apparatus 800 may include at least one controller 802 (e.g., a central processing unit (CPU), a graphics processing unit (GPU) or both, processor cores, compute nodes, etc.), a main memory 804 and a static memory 806 that communicate with each other via a link 808 (e.g., bus). The communication apparatus 800 may further include a display unit 810 (e.g., video, LED, LCD) and an alphanumeric input device 812 (e.g., a keypad, keyboard). In one embodiment, the display unit 810 and input device 812 may be incorporated as one unit as a touch screen display. The communication apparatus 800 may additionally include a storage device 816 (e.g., a drive unit), a signal generation device 818 (e.g., a speaker), a network interface device 820, and one or more sensors (not shown). The network interface device 820 may include one or more radios (e.g., transmitters and receivers) coupled to one or more antennas in order to communicate over a wireless network channel 826.

The storage device 816 includes a computer-readable medium 822 on which is stored one or more sets of data structures and instructions 824 (e.g., software) embodying or utilized by any one or more of the methodologies or functions described herein. The instructions 824 may also reside, completely or at least partially, within the main memory 804, static memory 806, and/or within the processor 802 during execution thereof by the communication apparatus 800, with the main memory 804, static memory 806, and the processor 802 also constituting computer-readable media.

While the computer-readable medium 822 is illustrated in an example embodiment to be a single medium, the term "computer-readable medium" may include a single medium or multiple media (e.g., a centralized or distributed database, and/or associated caches and servers) that store the one or more instructions 824.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, a system may include one or more processors and may be configured with instructions stored on a computer-readable storage device.

The instructions 824 may further be transmitted or received over the communications network 826 using one or more transmission mediums via the network interface device 820 utilizing any one of a number of well-known transfer protocols (e.g., HTTP). Examples of communication networks include a local area network (LAN), a wide area network (WAN), a wireless LAN (WLAN), the Internet, mobile telephone networks, plain old telephone (POTS) networks, and wireless data networks (e.g., WI-FI™, 3G, and 4G LTE/LTE-A or WiMAX networks). The term "transmission medium" shall be taken to include any intangible medium that is capable of storing, encoding, or carrying out instructions for execution by the communication apparatus, and includes digital or analog communications signals or other intangible medium to facilitate communication of such software. The network interface device may include one or more antennas for communicating with the wireless network. The network interface device 820 may include one or more different RATs such that the communication apparatus 800 may communicate over multiple RANs at different times or simultaneously.

The Abstract is submitted with the understanding that it will not be used to limit or interpret the scope or meaning of the claims. The following claims are hereby incorporated into the detailed description, with each claim standing on its own as a separate embodiment.

EXAMPLES

The following examples pertain to further embodiments.

Example 1 is User Equipment (UE) comprising hardware processing circuitry configured to: determine if radio access network (RAN) assistance information has been received from an evolved NodeB (eNB) of a RAN, the RAN assistance information including UE network settings; determine if the RAN assistance information is valid; perform traffic steering between the RAN and a wireless local area network (WLAN) when the RAN assistance information has been received and is valid; refrain from traffic steering and obtain new RAN assistance information when the RAN assistance information was not received or is not valid; and perform traffic steering between the RAN and the WLAN using the new RAN assistance information when new RAN assistance information is received.

In Example 2, the subject matter of Example 1 can optionally include wherein the UE is further configured to: receive an indication of available radio access network (RAN) assistance information from the 3GPP system; determine when data are to be transmitted from or received by the UE; obtain new RAN assistance information when the data are to be transmitted from or received by the UE and in response to the indication of available RAN assistance information; and perform a traffic steering decision between the 3GPP system and the WLAN based on the new or stored and valid RAN assistance information.

In Example 3, the subject matter of Examples 1-2 can optionally include wherein the UE is further configured to determine if an upload buffer is non-empty in order to determine when data are to be transmitted from the UE.

In Example 4, the subject matter of Examples 1-3 can optionally include wherein the UE is further configured to determine if a predetermined time has expired since receipt of a packet in order to determine when data are to be received by the UE.

In Example 5, the subject matter of Examples 1-4 can optionally include wherein the UE is further configured to determine when the UE does not have previously stored RAN assistance information and store the available RAN assistance information in the UE or replace the previously stored RAN assistance information by the available RAN assistance information.

In Example 6, the subject matter of Examples 1-5 can optionally include wherein the UE is a multi-RAT communication apparatus.

In Example 7, the subject matter of Examples 1-6 can optionally include wherein the UE is further configured to: receive a request for establishment of an RRC connection and/or transfer of data while the UE is in RRC_IDLE; obtain and store new RAN assistance information in response to receipt of an indication of the new or updated RAN assistance information from the 3GPP system or after receipt of a dedicated RAN assistance information message; when previously stored RAN assistance information is not available, perform a traffic steering decision between the 3GPP system and the WLAN based on the stored new RAN assistance information; and when previously stored RAN assistance information is available, use the previously stored and valid RAN assistance information to perform the traffic steering decision between the 3GPP system and the WLAN prior to receipt of the new or updated RAN assistance information.

In Example 8, the subject matter of Examples 1-7 can optionally include wherein the indication of the new or updated RAN assistance information comprises a systemInfoValueTag in SystemInformationBlockType1 or dedicated signaling to the UE.

In Example 9, the subject matter of Examples 1-8 can optionally include wherein the dedicated RAN assistance information message comprises an SIB 17 message.

In Example 10, the subject matter of Examples 1-9 can optionally include wherein the UE is further configured to obtain and store the available RAN assistance information when RAN assistance information has not been previously stored or is not valid.

In Example 11, the subject matter of Examples 1-10 can optionally include wherein the UE is further configured to: start a wait timer, having a predetermined time period, after receipt of a request for establishment of an RRC connection and/or transfer of data while the UE is in RRC_IDLE; and after expiration of the predetermined time period, use previously stored and valid RAN assistance information to perform a traffic steering decision between the 3GPP system and the WLAN, or prior to expiration of the predetermined time period and after receipt of a dedicated RAN assistance information message, obtain and store new or updated RAN assistance information from the 3GPP system and perform the traffic steering decision between the 3GPP system and the WLAN based on the new or updated RAN assistance information.

In Example 12, the subject matter of Examples 1-11 can optionally include wherein the RAN assistance information is valid if has not expired.

In Example 13, the subject matter of Examples 1-12 can optionally include wherein the UE is further configured to use the new or updated RAN assistance information for traffic steering after receipt of an indication from the 3GPP system of a subsequent modification period.

In Example 14, the subject matter of Examples 1-13 can optionally include wherein the UE is further configured to: receive an indication of available radio access network (RAN) assistance information from the 3GPP system; obtain and store new RAN assistance information from the 3GPP system; and perform a traffic steering decision between the 3GPP system and the WLAN based on the stored RAN assistance information and time elapsed since a data packet has been transmitted from or received by the UE.

In Example 15, the subject matter of Examples 1-14 can optionally include wherein the UE is further configured to receive the new RAN assistance information from a broadcast message or a dedicated message to the UE.

In Example 16, the subject matter of Examples 1-15 can optionally include wherein the traffic steering decision by the UE is determined by a $T_{steeringWLAN}$ timer that has been scaled according to an elapsed time since the data packet has been transmitted from or received by the UE.

In Example 17, the subject matter of Examples 1-16 can optionally include wherein the traffic steering decision by the UE is determined based on a $T_{steeringWLAN}$ timer that has been scaled according to a function of a probability of packet transmission from or reception by the UE based on traffic characteristics of a traffic session.

Example 18 is a method for RAN-wireless local area network (WLAN) interworking by User Equipment (UE), the method comprising: determining if radio access network (RAN) assistance information has been received from an evolved NodeB (eNB) of a RAN, the RAN assistance information including UE network settings; determining if the RAN assistance information is valid; performing traffic steering between the RAN and a WLAN when the RAN assistance information has been received and is valid; refraining from traffic steering and obtain new RAN assistance information when the RAN assistance information was not received or is not valid; and performing traffic steering between the RAN and the WLAN using the new RAN assistance information when new RAN assistance information is received.

In Example 19, the subject matter of Examples 1-18 can optionally include wherein the RAN assistance information comprises data that are broadcast by the 3GPP system that the UE uses to make traffic steering decisions and/or to configure its network settings to enable the UE to communicate with the 3GPP system.

Example 20 is a method for 3GPP-wireless local area network (WLAN) interworking by User Equipment (UE), the method comprising: steering traffic between the 3GPP system and the WLAN based on at least one of: when data are to be transmitted from or received by the UE, after updated radio access network (RAN) assistance information is available and/or after an elapsed time since data was last transmitted from or received by the UE.

In Example 21, the subject matter of Example 20 can optionally include determining the elapsed time since the data has been transmitted from or received by the UE by a $T_{steeringWLAN\ timer}$.

In Example 22, the subject matter of Examples 19-21 can optionally include receiving an indication of the updated RAN assistance information through a systemInfoValueTag in SystemInformationBlockType1 or dedicated signaling to the UE.

In Example 23, the subject matter of Examples 19-22 can optionally include wherein the dedicated RAN assistance information message comprises an SIB17 message.

Example 24 is a non-transitory computer-readable storage medium that stores instructions for execution by one or more processors to perform operations for traffic steering of a UE between a radio access network (RAN) and WLAN, the operations causing the UE to: determine if radio access network (RAN) assistance information has been received from an evolved NodeB (eNB) of a RAN, the RAN assistance information including UE network settings; determine if the RAN assistance information is valid; perform traffic steering between the RAN and a WLAN when the RAN assistance information has been received and is valid; obtain new RAN assistance information when the RAN assistance information was not received or is not valid; and perform traffic steering between the RAN and the WLAN using the new RAN assistance information when new RAN assistance information is received.

In Example 25, the subject matter of Example 24 can optionally include wherein the operations further cause the UE to: determine when data are to be transmitted from the UE by determination that an upload buffer is non-empty or an eNB/AP download buffer is non-empty.

In Example 26, the subject matter of Examples 24-25 can optionally include wherein the operations further cause the UE to: steer traffic based on stored and valid SIB information at the UE or after receipt of updated RAN assistance information.

What is claimed is:

1. User Equipment (UE) comprising hardware processing circuitry configured to:
   determine if radio access network (RAN) assistance information has been received from an evolved NodeB (eNB) of a RAN, the RAN assistance information including UE network settings;
   determine if the RAN assistance information is valid;
   perform traffic steering between the RAN and a wireless local area network (WLAN) when the RAN assistance information has been received and is valid;
   refrain from traffic steering and obtain new RAN assistance information when the RAN assistance information was not received or is not valid; and
   perform traffic steering between the RAN and the WLAN using the new RAN assistance information when new RAN assistance information is received.

2. The UE of claim 1, wherein the hardware processing circuitry is further configured to determine if a UE transmit buffer is non-empty prior to obtaining new RAN assistance information.

3. The UE of claim 1, wherein the hardware processing circuitry is further configured to:
   receive an indication of available RAN assistance information from the RAN;
   determine when data are to be transmitted from or received by the UE;
   obtain the new RAN assistance information when the data are to be transmitted from or received by the UE and in response to an indication of available RAN assistance information; and
   perform traffic steering between the RAN and the WLAN based on the new or stored and valid RAN assistance information.

4. The UE of claim 3, wherein the hardware processing circuitry is further configured to determine if a predetermined time has expired since receipt of a packet in order to determine when data are to be received by the UE.

5. The UE of claim 1, wherein the hardware processing circuitry is further configured to determine when the UE does not have previously stored RAN assistance information and store the available RAN assistance information in the UE or replace the previously stored RAN assistance information by the available RAN assistance information.

6. The UE of claim 1, wherein the UE is a multi-RAT communication apparatus.

7. The UE of claim 1, wherein the hardware processing circuitry is further configured to:
   receive a request for establishment of a radio resource control (RRC) connection and/or transfer of data while the UE is in RRC_IDLE;
   obtain and store new RAN assistance information in response to receipt of an indication of the new or updated RAN assistance information from the RAN or after receipt of a dedicated RAN assistance information message;
   when previously stored RAN assistance information is not available, perform a traffic steering decision between the RAN and the WLAN based on the stored new RAN assistance information; and
   when previously stored RAN assistance information is available, use the previously stored and valid RAN assistance information to perform the traffic steering decision between the RAN and the WLAN prior to receipt of the new or updated RAN assistance information.

8. The UE of claim 7, wherein the RAN assistance information is received in a system information block (SIB) or by radio resource control (RRC) signaling.

9. The UE of claim 7, wherein the hardware processing circuitry is further configured to obtain and store the available RAN assistance information when RAN assistance information has not been previously stored or is not valid.

10. The UE of claim 1, wherein the hardware processing circuitry is further configured to:
    start a wait timer, having a predetermined time period, after receipt of a request for establishment of a radio resource control (RRC) connection and/or transfer of data while the UE is in RRC_IDLE; and
    after expiration of the predetermined time period, use previously stored and valid RAN assistance information to perform a traffic steering decision between the RAN and the WLAN, or
    prior to expiration of the predetermined time period and after receipt of a dedicated RAN assistance information message, obtain and store new or updated RAN assistance information from the RAN and perform the traffic steering decision between the RAN and the WLAN based on the new or updated RAN assistance information.

11. The UE of claim 10, wherein the hardware processing circuitry is further configured to use the new or updated RAN assistance information for traffic steering after receipt of an indication from the RAN of a subsequent modification period.

12. The UE of claim 1, wherein the hardware processing circuitry is further configured to:
receive an indication of available RAN assistance information from the RAN;
obtain and store new RAN assistance information from the RAN; and
perform a traffic steering decision between the RAN and the WLAN based on the stored RAN assistance information and time elapsed since a data packet has been transmitted from or received by the UE.

13. The UE of claim 12, wherein the hardware processing circuitry is further configured to receive the new RAN assistance information from a broadcast message or a dedicated message to the UE.

14. The UE of claim 12, wherein the traffic steering decision by the UE is determined by a $Tsteering_{WLAN}$ timer that has been scaled according to an elapsed time since the data packet has been transmitted from or received by the UE.

15. The UE of claim 12, wherein the traffic steering decision by the UE is determined based on a $Tsteering_{WLAN}$ timer that has been scaled according to a function of a probability of packet transmission from or reception by the UE based on traffic characteristics of a traffic session.

16. The UE of claim 1, wherein the hardware processing circuitry is further configured to:
receive an indication of available RAN assistance information from the RAN;
obtain new RAN assistance information without determining when data are to be transmitted from or received by the UE;
store the new RAN assistance information in the UE; and
perform a traffic steering decision to WLAN based on the stored RAN assistance information.

17. The UE of claim 16, wherein the RAN assistance information comprises data that are broadcast by the RAN that the UE uses to make traffic steering decisions and/or to configure its network settings to enable the UE to communicate with the RAN.

18. A method for RAN-wireless local area network (WLAN) interworking by User Equipment (UE), the method comprising:
determining if radio access network (RAN) assistance information has been received from an evolved NodeB (eNB) of a RAN, the RAN assistance information including UE network settings;
determining if the RAN assistance information is valid;
performing traffic steering between the RAN and a WLAN when the RAN assistance information has been received and is valid;
refraining from traffic steering and obtain new RAN assistance information when the RAN assistance information was not received or is not valid; and
performing traffic steering between the RAN and the WLAN using the new RAN assistance information when new RAN assistance information is received.

19. The method of claim 18, further comprising:
determining an elapsed time since data has been transmitted from or received by the UE by a $Tsteering_{WLAN}$ timer; and
obtaining the new RAN assistance information based on the elapsed time.

20. The method of claim 18, further comprising receiving an indication of the new RAN assistance information through a systemInfoValueTag in SystemInformationBlock-Type1 or dedicated signaling to the UE.

21. The method of claim 20, wherein the dedicated RAN assistance information message comprises system information block (SIB) message.

22. A non-transitory computer-readable storage medium that stores instructions for execution by one or more processors to perform operations for traffic steering of a UE between a radio access network (RAN) and WLAN, the operations causing the UE to:
determine if radio access network (RAN) assistance information has been received from an evolved NodeB (eNB) of a RAN, the RAN assistance information including UE network settings;
determine when a UE transmit buffer is non-empty or an eNB/AP download buffer is non-empty prior to obtaining the new RAN assistance information.
perform traffic steering between the RAN and a WLAN when the RAN assistance information has been received and is valid;
obtain new RAN assistance information when the RAN assistance information was not received or is not valid; and
perform traffic steering between the RAN and the WLAN using the new RAN assistance information when new RAN assistance information is received.

23. The non-transitory computer-readable storage medium of claim 22, wherein the operations further cause the UE to:
perform traffic steering based on stored and valid system information block (SIB) information at the UE or after receipt of updated RAN assistance information.

* * * * *

UNITED STATES PATENT AND TRADEMARK OFFICE
CERTIFICATE OF CORRECTION

PATENT NO. : 9,622,284 B2  
APPLICATION NO. : 14/572641  
DATED : April 11, 2017  
INVENTOR(S) : Phuyal et al.

Page 1 of 1

It is certified that error appears in the above-identified patent and that said Letters Patent is hereby corrected as shown below:

On the Title Page

Item (72), "Inventors", Column 1, Line 3, delete "Sasha" and insert --Alexander-- therefor In the Claims Column 14, Line 36, Claim 22, delete "information." and insert --information;-- therefor Signed and Sealed this
Twenty-first Day of April, 2020

Andrei Iancu
*Director of the United States Patent and Trademark Office*